US007570939B2

(12) United States Patent
Culbert

(10) Patent No.: US 7,570,939 B2
(45) Date of Patent: Aug. 4, 2009

(54) RFID NETWORK ARRANGEMENT

(75) Inventor: Michael Culbert, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 404 days.

(21) Appl. No.: 11/220,205

(22) Filed: Sep. 6, 2005

(65) Prior Publication Data

US 2007/0054616 A1 Mar. 8, 2007

(51) Int. Cl.
 *H04M 1/66* (2006.01)
(52) U.S. Cl. .................. 455/410; 455/557; 455/41.2; 455/343.3; 455/3.03; 709/203
(58) Field of Classification Search .............. 455/410, 455/557, 41.2, 343.3, 3.03; 709/203
See application file for complete search history.

(56) References Cited

U.S. PATENT DOCUMENTS

| 6,115,616 | A  | * | 9/2000  | Halperin et al. ............. 455/557 |
| 6,886,095 | B1 |   | 4/2005  | Hind et al. .................. 713/168 |
| 2003/0163542 | A1 | * | 8/2003  | Bulthuis et al. ............. 709/208 |
| 2004/0111520 | A1 |   | 6/2004  | Krantz et al. ............... 709/229 |
| 2004/0133689 | A1 |   | 7/2004  | Vasisht ....................... 709/228 |
| 2004/0176032 | A1 | * | 9/2004  | Kotola et al. ............... 455/41.2 |
| 2004/0205191 | A1 |   | 10/2004 | Smith et al. ................ 709/227 |
| 2005/0050318 | A1 |   | 3/2005  | Alone et al. ................ 713/155 |
| 2005/0054369 | A1 |   | 3/2005  | Murakami ................... 455/525 |
| 2005/0160138 | A1 | * | 7/2005  | Ishidoshiro ................. 709/203 |
| 2005/0166072 | A1 | * | 7/2005  | Converse et al. ........... 713/201 |
| 2006/0013148 | A1 | * | 1/2006  | Burman et al. .............. 370/252 |
| 2006/0068750 | A1 | * | 3/2006  | Burr ......................... 455/343.1 |
| 2007/0022055 | A1 | * | 1/2007  | Eliason et al. ............... 705/51 |

OTHER PUBLICATIONS

Wi-Fi Alliance; "Wi-Fi Protected Access;" rev. Mar. 23, 2005; pp. 1-3.
Wi-fiplanet.com; "RFID Primer: Where the WLAN Hits the RFID Fan" Dec. 23, 2003; http://www.wi-fiplanet.com/tutorials/print/php/3292521.
Notebookreview.com; "In Depth Preview: Apple AirPort Express with Air Tunes;" Jun. 10, 2004; http://notebookreview.com/default.asp?newsID=1894.

* cited by examiner

*Primary Examiner*—Matthew D Anderson
*Assistant Examiner*—Minh D Dao
(74) *Attorney, Agent, or Firm*—Wong, Cabello, Lutsch, Rutherford & Brucculeri, LLP

(57) ABSTRACT

A system for automatic configuration and authentication of network devices is disclosed. A network base station, e.g., a wireless router, includes an RFID transceiver. A network device includes an RFID tag. Then the network device is brought into proximity with the base station, an exchange of information takes place between the RFID transceiver in the base station and the RFID tag in the device. When the network device is powered on, it reads the information in its RFID tag and uses this information to establish a limited connection to the base station. Once connected, the base station and network device exchange authentication and encryption parameters over the limited connection and thus establish a fully functional and secure network connection between the network base station and the network device.

22 Claims, 2 Drawing Sheets

RFID NETWORK ARRANGEMENT

BACKGROUND

Within the last several years, wireless networking has become increasingly popular. Wireless networking provides numerous benefits, both in public settings and within a closed home or office network. However, installing and configuring wireless network devices requires some understanding of the configuration parameters of the various network protocols. Many users, particularly home and small office users, lack the level of knowledge necessary to install and configure wireless network devices, and are thus unable to take advantage of the benefits of wireless networking.

An even greater problem lies in a lack of security of wireless networks. Despite the fact that fairly robust security algorithms have been developed, often these algorithms are not implemented. Again, this problem is especially acute with respect to home and small office users, who may be relatively unsophisticated with respect to wireless networking security protocols and lack the resources to employ more highly trained network administrators or information technology support staff. Contributing to the problem is the fact that most wireless device manufacturers ship their devices with such security features disabled. As a result, many users never enable the security features, and many wireless networks are left unsecured.

Still another problem is the use of primitive devices that lack user interfaces sophisticated enough to properly configure wireless network. One example of such a device might be a remote control for controlling the playback of audio and/or video media using a computer. Although prior art devices to do so have required additional interfaces, e.g., infrared transceivers, to be added to the computer system, it would be advantageous to provide a remote control that interfaced with a preexisting interface of the computer, e.g., the wireless network interface. However, typical remote controls lack user interfaces of sufficient sophistication to configure a wireless network connection.

Therefore, what is needed in the art is a system for simplifying the configuration of wireless network devices and minimizing the amount of traditional user interface required to do so, while still permitting users to employ robust authentication and encryption algorithms.

SUMMARY

A system for automatic configuration and authentication of network devices is disclosed. A network base station, e.g., a wireless router, includes an RFID transceiver. A network device includes an RFID tag. Then the network device is brought into proximity with the base station, an exchange of information takes place between the RFID transceiver in the base station and the RFID tag in the device. When the network device is powered on, it reads the information in its RFID tag and uses this information to establish a limited connection to the base station. Once connected, the base station and network device exchange authentication and encryption parameters over the limited connection and thus establish a fully functional and secure network connection between the network base station and the network device.

DETAILED DESCRIPTION

A system for automatic configuration and authentication of wireless network devices is described herein. The following embodiments of the invention, described in terms of devices and applications compatible with computer systems manufactured by Apple Computer, Inc. of Cupertino, Calif., are illustrative only and should not be considered limiting in any respect.

Figure 1:
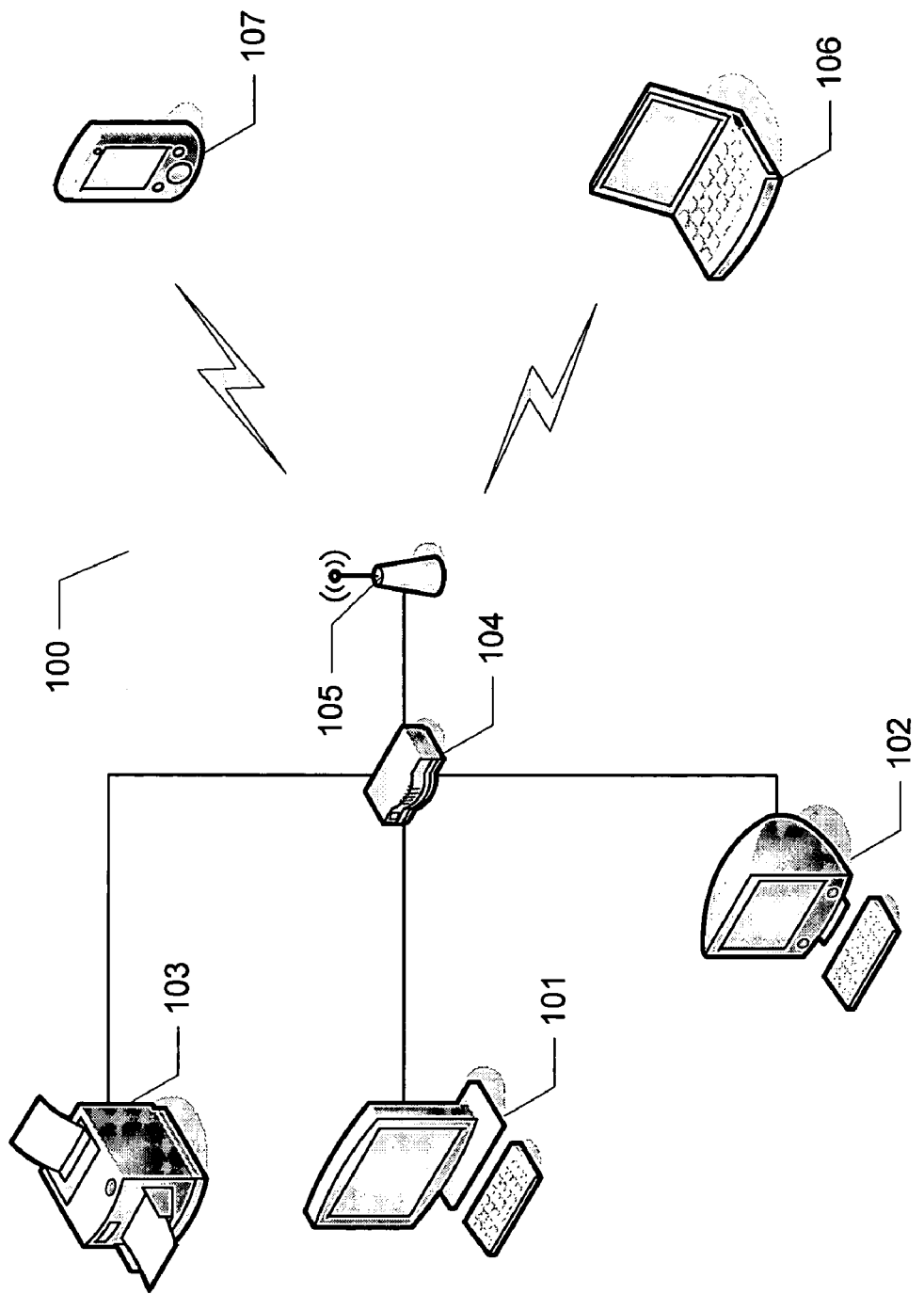
FIG. 1 illustrates a wireless network in which certain teachings of the present disclosure may be practiced.

An exemplary network 100 is illustrated in FIG. 1. Network 100 comprises various devices, such as personal computers 101 and 102 along with printer 103. As illustrated, these devices are interconnected by hub/router/switch 104. Network 100 may also be connected to the Internet through router 104 and some form of broadband modem, e.g., DSL (digital subscriber line) or cable (not shown). Also included in network 100 is wireless access point (or base station) 105, which provides a wireless link to portable computer 106 and PDA (personal digital assistant) 107. The wireless network interface preferably takes the form of a "WiFi" interface according to the IEEE (Institute of Electrical and Electronics Engineers) 802.11, 802.11a, 802.11b, or 802.11g standards, which are hereby incorporated by reference, although other wireless networking protocols could be used. In some embodiments, wireless access point 105 may be integral with router 104. Depending on the exact functionality required, router 104 may be some combination of switch, hub, firewall, router, wireless access point, wireless repeater, DHCP (dynamic host configuration protocol) server, etc. This type of combination device is generally known in the art, and many commercial embodiments of such devices are available, examples of which include the AirPort Extreme and AirPort Express base stations available from Apple Computer.

For a device such as portable computer 106 and PDA 107 to communicate with wireless access point 105, it is necessary for the device to "associate" with the wireless network, which is the process by which a physical layer connection to the network is established. Each association requires the device and the network to have a common set of communication parameters, such as an extended service set identifier (ESSID), radio channel, etc. If these parameters do not match between the device and the base station, the device will not be able to communicate with the network. Historically, configuring these parameters on the device and base station has required manual configuration by the user.

The complexity of configuring wireless devices and wireless network access points is increased when various security protocols are enabled, although performance and security of the network is enhanced. Using the standard WEP (Wired Equivalent Privacy) encryption standard, configuration is somewhat simplified in that an encryption key, typically either 40 or 128 bits in length must be entered on both the device and base station. The situation may become somewhat more complicated when enhanced security algorithms are used. One such enhanced security algorithm that may be used is WPA (WiFi Protected Access). WPA encryption is described in the IEEE 802.11i standard, which is hereby incorporated by reference. Those skilled in the art are generally familiar with this security framework, and thus the details are not repeated here.

Figure 2:
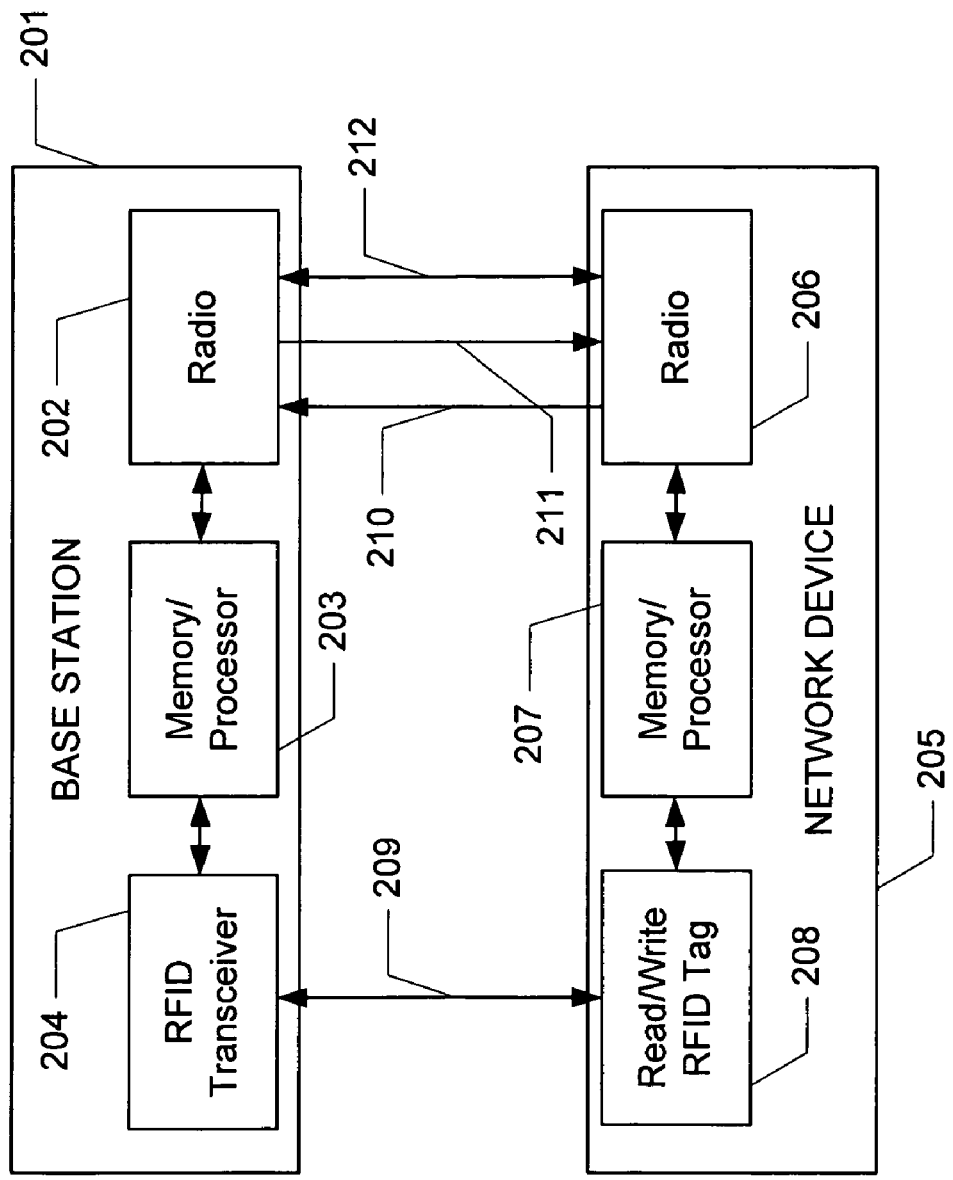
FIG. 2 illustrates a wireless network base station and a wireless network device embodying certain teachings of the present invention.

In any case, what is needed is a way to simplify the configuration of wireless network devices and access points. Such a system is illustrated in high-level block diagram form in FIG. 2. Wireless base station 201 includes the conventional radio 202 and memory/processor arrangement 203. Construction of these devices is generally known in the art, and thus details are not repeated here. However, base station 201 also includes an RFID (radio frequency identification) transceiver 204. RFID transceivers are also known as RFID tag readers. The presence of RFID transceiver 204 may be better understood with respect to the operation of the system, described below. A second component of the system illustrated in FIG. 2 is wireless network device 205, which also includes the conventional radio 206 and memory processor 207. However, the network device 205 also includes read/write RFID tag 208. RFID tags are also known as RFID transponders. RFID transceivers and tags themselves are generally known in the art, and thus details of their construction are not reproduced herein.

Operation of the system is as follows. Base station 201 is configured, either by the user or from the factory with various communication setup and security parameters. To add a new network device 205 to the network, the user simply brings network device 205 into close proximity with base station 201. When the devices are brought into proximity, RFID transceiver 204 in base station 201 is able to read (and write to) the RFID tag in network device 205. When RFID transceiver 204 establishes communication 209 with RFID tag 208, it transmits to the tag various communication and security parameters (including authentication and encryption passwords) necessary for the network device to establish communication with the base station using the conventional radios and protocols (e.g., a WiFi connection). RFID transceiver may receive these parameters from the "conventional" components of base station 201 by interaction with memory/processor 203 of the base station.

Subsequently, when network device 205 is activated, its own internal memory/processor 207 obtains the communication and security parameters written to RFID tag 208 by the base station's RFID transceiver and uses these parameters to establish communication 210 with the base station 201 using the conventional (e.g., WiFi) radios. In some embodiments, the information provided by RFID transceiver 204 to RFID tag 208 may only be sufficient to establish a limited network connection 210 between network device 205 and base station 201. In this case, additional information 211 will be relayed between the base station 201 and network device 205 to establish a full connection 212 between the devices.

A reasonable level of security may thus be obtained without the user being required to manually configure the security settings. The network device 205 may be authenticated by virtue of a parameter written to network device RFID tag 208 by the base station RFID transceiver 204. When the network device attempts to establish the conventional networking connection, its possession of the correct authentication identifier, which could only have been obtained by being brought within close physical proximity to the base station, will allow it to communicate over the wireless network. The network device will also possess any encryption key necessary to communicate securely with the base station 201.

As is known to those skilled in the art, particular RFID tag designs and operating frequencies may result in various ranges of operation for RFID transceiver 204 and RFID tag 208. In accordance with the teachings herein, it is preferable that the range between network device 205 and base station 201 be relatively small to ensure that unauthorized users are not able to connect to the wireless network by bringing unauthorized devices within the RFID system's operating range of the base station. An appropriate distance varies with application, but would typically be on the order of one foot.

In an alternative construction, the RFID tag 208 in the network device need not be a read/write RFID tag, but rather may be a read-only tag. In this embodiment, the RFID transceiver in the base station may record an identifier encoded on the RFID tag in the network device when the network device is brought within close proximity of the base station. When network device later attempts to connect over the wireless network using the conventional radios, it will provide this identifier. Because the base station will have previously received this identifier from the RFID transceiver, a connection will be allowed as the device will have been authenticated. The identifier also preferably contains sufficient information concerning the default communication parameters of the network device for the base station to temporarily alter its own configuration parameters so as to establish connection with the network device. Alternatively, the base station may use the default parameters indicated by the received identifier to establish an additional wireless network having configuration parameters corresponding to the default parameters of the network device. In either case, the devices are preferably programmed to use this initially established connection to exchange the necessary parameters to establish a non-default, secure (i.e., authenticated and encrypted) wireless network connection between the network device and the base station.

Additionally, security may be further enhanced by providing time limits between the time the network device is brought into close proximity of the base station and when it attempts to establish a wireless network connection. It should also be noted that is not necessary for network device 205 to be powered at the time it is brought into proximity, as RFID tag 208 may have its own power source or may be a passive-type RFID tag.

The simplified technique for configuring a wireless network device described herein has a variety of applications. For example, base station may be a stand alone hub/router/switch devices, such as the AirPort Extreme base station or AirPort Express base station provided by Apple computer. The network device may be a desktop or notebook computer or personal digital assistant having a wireless network interface integrated therein. Alternatively, the network device may be a stand alone wireless network interface that will later be installed in a portable computer or the like, such as on a PCMCIA card. In still another embodiment, the network device could be an additional hub/router/repeater device, such as the AirPort Express base station, also available from Apple Computer, that is being used to extend the range of the wireless network created by the base station. In still other embodiments, the base station may be a personal computer having a wireless network interface that is acting as hub, router, switch, gateway, etc. for a network.

In still another embodiment, the network device may be a wireless network enabled peripheral or other "primitive device," i.e., a device that lacks a traditional user interface like would be found in a computer or PDA. For example, a printer may include a wireless network interface that allows other computers on the network, either wired or wirelessly, to print to the printer. Because printers typically lack alphanumeric input devices and displays, it would be difficult to configure such a device to operate over a wireless network.

In still another embodiment, a primitive device may be a remote control for controlling the playback of audio and/or video media on a personal computer. One such example would be a remote control for controlling the operation of the iTunes music software provided by Apple computer. Historically, such devices have required an additional interface, such as an infrared transceiver to be installed in the computer. However, it would be preferable to allow such a device to use an existing input output mode of the computer, such as a wireless network. Such a remote control might have buttons for a variety of playback-oriented functions, such as play, pause, skip forward, skip back, volume control, etc, but such a device might not include an alphanumeric keypad or display device suitable to allow configuration of the device to operate over a wireless network. Using the teachings herein, such a remote control could be configured merely be bringing it into proximity with the computer or network base station.

Various other arrangements are possible, and will be readily apparent to those skilled in the art. For example, for this disclosure, the term "computer" does not necessarily mean any particular kind of device, combination of hardware and/or software, nor should it be considered restricted to either a multi purpose or single purpose device. It is intended that all such variations and modifications fall with in the scope of the following claims.

What is claimed is:

1. A method for configuring a wireless networking device, the method comprising:
    interacting with an RFID tag in the wireless networking device when the networking device is brought into physical proximity with a wireless networking base station, such that the interaction causes configuration information to be exchanged between the RFID tag and an RFID transceiver in the base station that facilitates establishment of a wireless network connection between the networking device and the base station; and
    storing the configuration information to the RFID tag persistently, whereby future establishment of a wireless connection between the networking device and the base station is established without interacting with an RFID transceiver.

2. The method of claim 1 wherein interacting with the RFID tag comprises storing the configuration information to the RFID tag persistently when the wireless networking device is not powered on.

3. The method of claim 1 wherein the configuration information includes an authentication parameter.

4. The method of claim 1 wherein the configuration information includes an encryption key.

5. The method of claim 1 wherein interacting with the RFID tag comprises reading an identifier from the RFID tag.

6. The method of claim 5 wherein the identifier may be used by the base station to determine default configuration parameters of the network device and establish a wireless network connection between the base station and the networking device using the default configuration parameters.

7. The method of claim 5 wherein the identifier may be used by the base station to authenticate the network device when a wireless network connection is established between the base station and the networking device.

8. A wireless networking base station comprising:
    a radio;
    a memory and processor; and
    an RFID transceiver, wherein the RFID transceiver is configured to exchange configuration information with an RFID tag located in a wireless network device to facilitate establishing a wireless network connection between the network device and the base station whereby the configuration information is stored persistently to the RFID tag allowing future establishment of a wireless connection between the networking device and the base station without interacting with an RFID transceiver.

9. The base station of claim 8 wherein the configuration information includes an authentication parameter.

10. The base station of claim 8 wherein the configuration information includes an encryption key.

11. The base station of claim 8 wherein exchanging information with an RFID tag comprises the RFID transceiver reading an identifier from an RFID tag.

12. The base station of claim 11 wherein the identifier may be used by the base station to determine default configuration parameters of the network device and establish a wireless network connection between the base station and the network device using the default configuration parameters.

13. The base station of claim 11 wherein the identifier may be used by the base station to authenticate the network device when a wireless network connection is established between base station and the network device.

14. A wireless networking device comprising:
    a radio;
    a processor and memory; and
    an RFID tag, wherein the RFID tag interacts with an RFID transceiver in a wireless networking base station to enable the networking device to establish a wireless network connection with the base station and stores configuration information to the RFID tag persistently, whereby future establishment of a wireless connection between the networking device and the base station is established without interacting with an RFID transceiver.

15. The networking device of claim 14 wherein the interaction between the RFID tag and the RFID transceiver is performed when the wireless networking device is not powered on.

16. The networking device of claim 14 wherein the configuration information includes an authentication parameter.

17. The networking device of claim 14 wherein the configuration information includes an encryption key.

18. The networking device of claim 14 wherein the interaction between the RFID tag and the RFID transceiver comprises the RFID transceiver reading an identifier from the RFID tag.

19. The networking device of claim 18 wherein the identifier may be used by the base station to determine default configuration parameters of the networking device and establish a wireless network connection between the base station and the networking device using the default configuration parameters.

20. The networking device of claim 18 wherein the identifier may be used by the base station to authenticate the networking device when a wireless network connection is established between base station and the networking device.

21. The networking device of claim 14 wherein the networking device is a primitive device.

22. The networking device of claim 14 wherein the networking device is a remote control.

* * * * *